United States Patent [19]

Rasmussen et al.

[11] Patent Number: 5,237,611

[45] Date of Patent: Aug. 17, 1993

[54] ENCRYPTION/DECRYPTION APPARATUS WITH NON-ACCESSIBLE TABLE OF KEYS

[75] Inventors: Harry R. Rasmussen, Tacoma; Jack D. LaBounty, Bellevue; Michael J. Rosenow, Issaquah, all of Wash.

[73] Assignee: Crest Industries, Inc., Pacific, Wash.

[21] Appl. No.: 917,598

[22] Filed: Jul. 23, 1992

[51] Int. Cl.$^5$ ............................................. H04L 9/00
[52] U.S. Cl. ...................................... 380/21; 380/30; 380/44; 380/45
[58] Field of Search ................. 380/21, 44, 45, 47, 380/29, 30

[56] References Cited

U.S. PATENT DOCUMENTS

| | | | |
|---|---|---|---|
| Re. 33,189 | 3/1990 | Lee et al. ............................... | 380/21 |
| 4,218,582 | 8/1980 | Hellmann et al. ..................... | 178/22 |
| 4,578,531 | 3/1986 | Everhart et al. ...................... | 380/21 |
| 4,607,137 | 8/1986 | Jansen et al. .......................... | 380/21 |
| 4,677,670 | 6/1987 | Henderson, Jr. ...................... | 380/23 |
| 4,771,462 | 9/1988 | Hannan et al. ........................ | 380/44 |
| 4,809,327 | 2/1989 | Shima .................................... | 380/44 |
| 4,876,716 | 10/1989 | Okamoto ............................... | 380/21 |
| 4,888,802 | 12/1989 | Cooney .................................. | 380/49 |
| 4,910,776 | 3/1990 | Dyke ..................................... | 380/25 |
| 4,985,919 | 1/1991 | Naruse et al. ......................... | 380/18 |
| 5,001,750 | 3/1991 | Kato et al. ............................. | 380/18 |
| 5,003,597 | 3/1991 | Merkle .................................. | 380/37 |
| 5,029,208 | 7/1991 | Tanaka .................................. | 380/21 |
| 5,073,935 | 12/1991 | Pastor ................................... | 380/30 |
| 5,081,678 | 1/1992 | Kaufman et al. ..................... | 380/21 |
| 5,124,117 | 6/1992 | Tatebayashi et al. ................. | 380/21 |
| 5,144,665 | 9/1992 | Takaragi et al. ...................... | 380/21 |

OTHER PUBLICATIONS

Schneier, B., "Untangling Public-Key Cryptography," *Dr. Dobb's Journal*, May 1992, 8 pages.

Primary Examiner—David Cain
Attorney, Agent, or Firm—Christensen, O'Connor, Johnson & Kindness

[57] ABSTRACT

An encryption/decryption unit (EDU) that handles management of encryption keys used in the secure exchange of data over non-secure communication links. Each EDU includes a central processing unit (CPU) that controls its operation, random access memory (RAM) in which tables of key exchange keys (KEKs) are stored, and a data encryption standard (DES) coprocessor that implements a data encryption algorithm developed by the U.S. National Bureau of Standards—all comprising a module that is embedded in a potting material. Attempts to remove the potting material either by mechanical or solvent means are likely to result in loss of the data and program code stored in the module. The CPU includes special circuitry enabling it to operate in an encrypted mode so that it can not be interrogated to discover the program or data stored therein. This program enables the EDU to establish secure communications with another similar EDU over a non-secure link. Each EDU establishing a secure communications session randomly generates a portion of a session data encryption key (DEK) that is encoded by using a KEK from either a public or private table of keys stored in the embedded RAM. The two EDUs exchange the encrypted portions of the DEK, decrypt the portions, and then logically combine them to determine the current session DEK. Use of a stored EDU ID in each EDU comprising the link prevents a third EDU from bridging the link to tap into the communications between two stations.

29 Claims, 5 Drawing Sheets

ENCRYPTION/DECRYPTION APPARATUS WITH NON-ACCESSIBLE TABLE OF KEYS

FIELD OF THE INVENTION

The present invention generally pertains to apparatus for encrypting and decrypting data, and more specifically, to apparatus for implementing the encryption and decryption process with secret encryption keys.

BACKGROUND OF THE INVENTION

Procedures for encrypting and decrypting data for transmission over non-secure radio or telephone links have been highly refined to meet the needs of the military and industry. An encryption algorithm that is virtually unbreakable in any reasonable time frame, by even the most powerful of high-speed computers, has been developed and published by U.S. National Bureau of Standards and sanctioned for use by industry in this country as an acceptable method for protecting computerized data conveyed over non-secure channels. In fact, integrated circuits designed specifically for encryption and decryption of data in accordance with this Data Encryption Algorithm (DEA) are readily available from several vendors, such as Western Digital TM. The algorithm, like most encryption schemes, uses an encryption key to encrypt data. Successful use of the DEA, and almost any other encryption/decryption algorithm commonly employed, requires that the station receiving the encrypted transmission have the same key used to encrypt the data in order to decrypt it. Accordingly, no unauthorized party should know or have access to the encryption key that is being used.

Unfortunately, for any prior art encryption/decryption system using the DEA or similar algorithms, extensive security measures are required for managing and periodically changing the encryption keys that are used. Any third party that gains access to the encryption key being used to encrypt data can tap into a non-secure line over which encrypted messages are transmitted and then use the key to decrypt messages that are intercepted. Even if knowledge of the encryption key used is limited to those operating the encryption/decryption equipment, there can be no assurance that others outside an organization will not breach security and learn the encryption key due to failure of someone in the organization to follow security procedures. As the size of a network over which secure communications must be maintained expands, the difficulty in managing the encryption keys used on the network grows exponentially.

Since any person with access to the encryption keys can breach the security of encrypted communications between members of the network, encryption keys must be changed on a regular basis. Frequent changes in the encryption keys in use minimizes the risk of disclosure by individuals that previously had access to the keys. However, any such change requires that the new encryption keys be distributed to all stations in the network. Typically, the new encryption keys are hand carried to each station site by bonded couriers; nevertheless, it is possible that a courier may compromise security. Even if a security breach does not occur, the cost of regularly distributing encryption keys to each station of a large network in this manner may be prohibitive.

For these reasons, it is preferable to use encryption keys at each station in a network that are not known to anyone, even those operating the encryption/decryption apparatus. Various techniques have been developed to access encryption keys stored in an electronic memory for this purpose. For example, a new encryption key can be selected for subsequent encryption of communications between stations based on the last encryption key that was used, by applying a secret formula to generate the new key. However, if the formula is discovered or otherwise becomes known by someone who is outside the organizational network, security of the encryption system is breached, since that person can generate the encryption keys that will subsequently be used, simply by applying the formula to any previously discovered key.

Clearly, it would be preferable to randomly generate the encryption key that is used to encrypt data transmitted to another station each time that communications are initiated. Yet, random generation of an encryption key at one station inherently renders the receiving station unable to decrypt the message, because it does not have the encryption key used. What is therefore required are means for transmitting the encryption key from one station to another in an encrypted form, with some provision that enables the receiving station to decrypt the encryption key. Prior art encryption/decryption apparatus do not provide means to accomplish this task in an efficient manner that is not easily cirumvented. Any key exchange key (KEK) that is used in the process of transferring an encryption key for encrypting and decrypting the message to the other station must be available to both stations, but can not be available to anyone outside the secure network of stations. Even if the encryption apparatus is available to someone outside the organization, it should be virtually impossible to discover the KEKs used by stations comprising the network, if secure communications are to be maintained.

The foregoing aspects and many of the attendant advantages of this invention over the prior art will become more readily appreciated as the same becomes better understood by reference to the following detailed description, when taken in conjunction with the accompanying drawings.

SUMMARY OF THE INVENTION

In accordance with the present invention, encryption/decryption apparatus for ensuring secure communications between two stations include encryption processor means for encrypting and decrypting data using a session data encryption key (DEK) that is input thereto. Control means coupled to the encryption processor means. are provided for controlling the operation of the encryption processor means. The control means supply the encryption processor means with the data for encryption and decryption and with an encryption key for use in encrypting and decrypting the data to produce an output signal in response to programmed instructions. These programmed instructions cause the control means to automatically randomly select a part of a session DEK and to combine it with another part of the session DEK received from the other station to determine the session DEK that will be used by the encryption processor means to encrypt data. Non-volatile memory means that are coupled to the control means store a plurality of key encryption keys that are used by the encryption processor means in encrypting a part of the session DEK for transmission to the other station. The control means select the key encryption key from the plurality of key encryption keys as a function of a check value determined with the part of the session key.

Within the non-volatile memory means is disposed an internal power source that provides electrical power to maintain storage of the plurality of key encryption keys. Potting means encapsulate the encryption processor means, the control means, and the non-volatile memory means in a radio and light wave opaque material that is sufficiently hard and resistant to dissolution by solvents to prevent its removal without damage to interconnections coupling the non-volatile memory means to the control means and damage to interconnections supplying electrical power to the non-volatile memory means from the internal power source. Such damage causes erasure of the plurality of key encryption keys stored in the non-volatile memory means. In addition, the control means respond to any attempt to externally interrogate the non-volatile memory means by causing erasure of the key encryption keys stored therein.

Multiplexer means are coupled to the control means to receive a data signal and a select signal therefrom, and are also coupled to the encryption processor means, an output port, and the memory means; the multiplexer means selectively convey the data signal to one of the encryption processor means, the output port, and the memory means, in response to the select signal. The control means include a non-volatile memory for retaining program steps and a unique identification code that identifies a specific encryption/decryption apparatus. In addition, the control means include means for locking the control means and its non-volatile memory to prevent data and program steps from being read externally after storage of the program steps in the non-volatile memory is complete. The means for locking include means for encrypting data and memory addresses defining memory storage locations within the non-volatile memory of the control means and within the non-volatile memory means.

DETAILED DESCRIPTION OF THE PREFERRED EMBODIMENT

Figure 1:
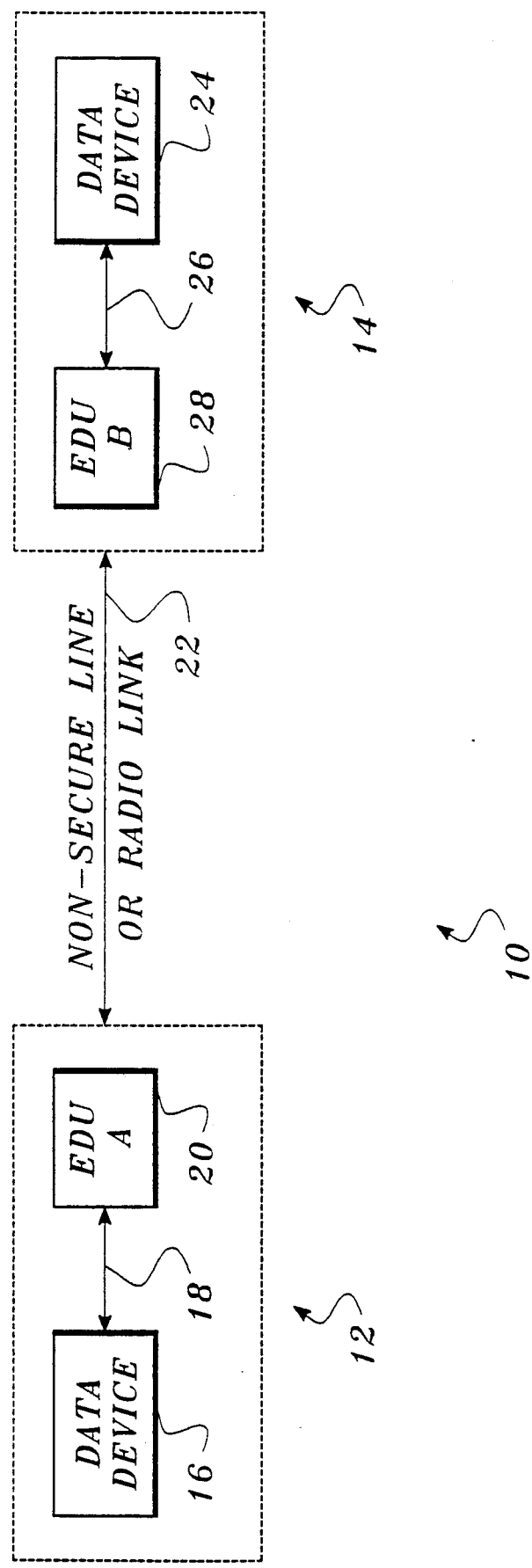
FIG. 1 is a block diagram of a communications network comprising two stations, each provided with an encryption/decryption unit (EDU) in accordance with the present invention, thereby enabling the stations to establish secure communications over a non-secure line or radio link.

As noted above, one of the more difficult problems in establishing and maintaining an encrypted communication network is distributing secure DEKs to each station in the network on a regular basis. In FIG. 1, a simple network for carrying out encrypted communications is shown generally at reference numeral 10. Network 10 is shown simply as two stations, including a station 12 and a station 14, but it will be appreciated that the network can comprise many other such stations.

Both stations 12 and 14 use similar components for encrypting and decrypting communications. For example, station 12 includes a data device 16, which may, for example, comprise a fascimile machine or personal computer (neither shown separately). Data device 16 is connected through lines 18 to an EDU A 20. Station 12 uses EDU A 20 to establish secure communications over a non-secure line (or radio link) 22 with station 14, which includes an EDU B 28. EDU B 28 is connected to a data device 24 over lines 26. Data device 24 is the same type of device as data device 16. Thus, if data devices 16 and 24 are fascimile machines, communications network 10 permits secure communication of facsimile information in an encrypted form between stations 12 and 14 over non-secure line 22.

Because of the manner in which secure communications are established between EDU A 20 and EDU B 28, tapping into non-secure line 22 using a similar EDU (not shown) would NOT enable a third party to breach secure communications between stations 12 and 14. In the preferred form of the present invention, communications between EDU A 20 and EDU B 28 are carried out using a session encryption key that is changed with each session and comprises two parts, one part randomly selected by EDU A 20, and the other part randomly selected by EDU B 28. Thus, the present invention comprises the EDU at each of the communicating stations 12 and 14. In establishing secure communications between two stations 12 and 14, the EDU at each station randomly select its respective portion of the session encryption key, encrypts that portion of the session encryption key, and transmits the encrypted respective portion of the session encryption key to the other station. Once both station 12 and station 14 have decrypted the portion of the session encryption key developed by the other station, the two portions are logically combined at each station to produce the complete or final session encryption key used for encrypting data transmitted between stations 12 and 14 during the current session. In addition, the EDUs are preprogrammed to ensure that the intended station in a two-way communication link is actually receiving or transmitting the encrypted data, to guard against a third party tapping into non-secure line 22 with another EDU. The EDUs also ensure that the two portions of the session encryption key that are exchanged between stations 12 and 14 are correctly received and decrypted, thereby protecting against data errors that might have arisen in the transmission of the encrypted portions of the session encryption key between the two stations or in their decryption.

Figure 2:
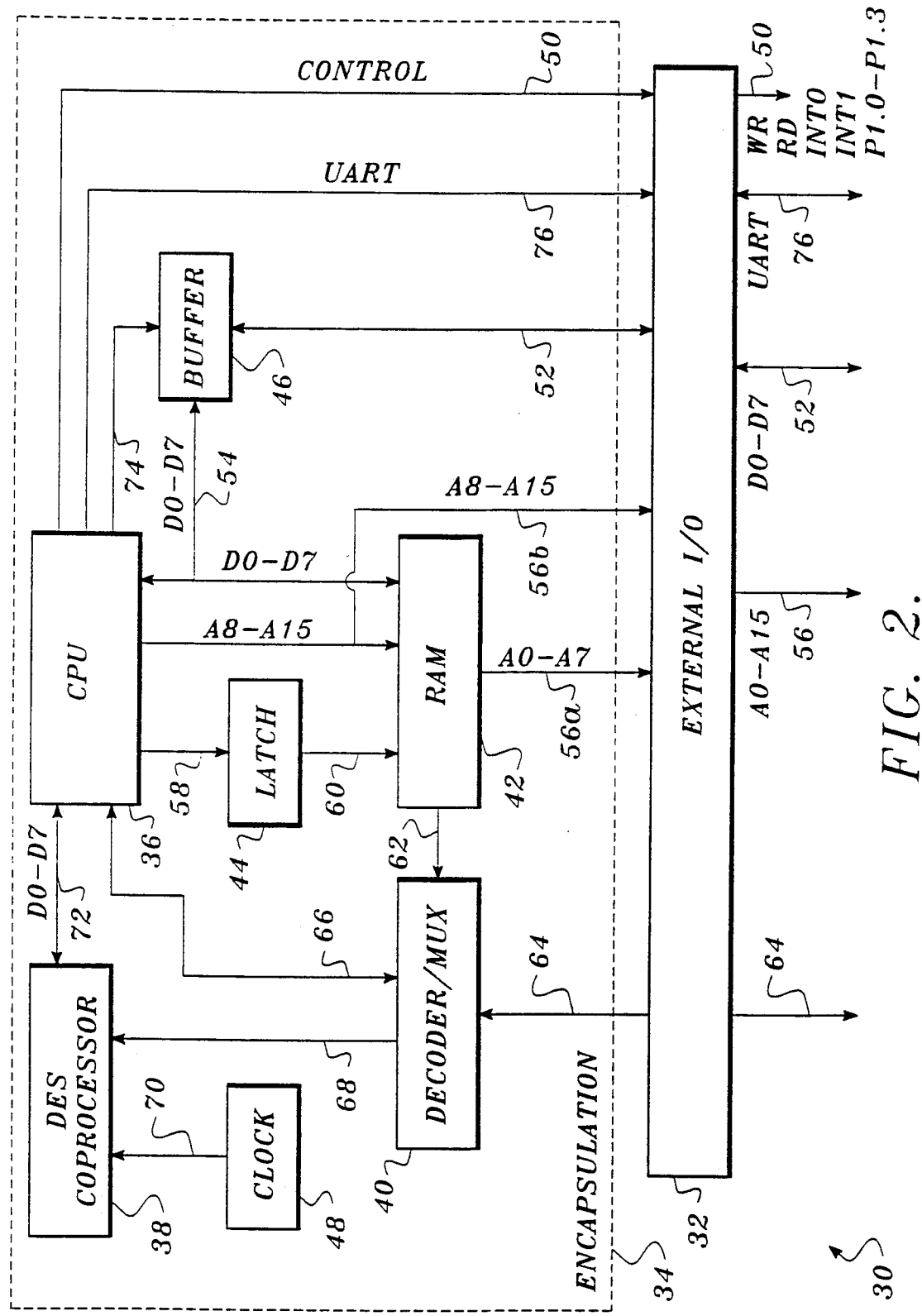
FIG. 2 is a schematic block diagram of one of the EDUs shown in FIG. 1.

A block diagram of EDU 20 is shown in FIG. 2; EDU 28 is exactly the same, except for having a different EDU identification number stored within it. EDU 20 includes a potted module 30 and an external input/output (I/O) bus 32 for providing interconnections between the EDU and the data device (or to other components, if the EDU is used as an element of a more extensive data encryption apparatus) that will provide the data to be encrypted or will receive the data that is decrypted by the EDU. Module 30, which comprises virtually the entire EDU, is encapsulated within a radio opaque and light opaque potting compound 34 to prevent discovery of the internal circuitry and to prevent forced electromagnetic or visual tapping, monitoring, or other forms of penetration that might be attempted to uncover encryption keys and other information included therein. The potting compound is sufficiently hard and resistant to abrasion to prevent its removal without damaging the components comprising the EDU or at least causing loss of important data stored therein. Of greatest sensitivity to maintaining the security of communications between EDUs comprising a network is the need to protect against discovery of KEKs that are encrypted using a key that is unique to each EDU and is assigned to it when it is initialized. The encrypted KEKs are stored as tables within each EDU and are utilized for encrypting portions of the session encryption key that are exchanged between two stations and subsequently logically combined at each EDU to produce a session DEK that is used for encryption of data exchanged over non-secure line 22. To avoid breaching the security of communications on network 10, it is absolutely imperative that these KEKs not become publicly known.

In the preferred form of module 30, two sets or tables of KEKs are stored in encrypted form in a random access memory (RAM) 42. One set is called a "public" set, since each EDU that will be sold will include this set. The other set is a "private" set of KEKs, which optionally may be randomly generated by a user for distribution to and storage in those EDUs comprising a private network of stations. The significance of the KEKs will be apparent from the description that follows. Any attempt to expose the internal circuitry of module 30 by use of a chemical, solvent, or mechanical means in order to access RAM 42 electronically or physically so as to access these data will cause loss of the KEKs that are stored therein. RAM 42 preferably comprises a Dallas Semiconductor TM type DS 1213 smart socket in which is installed a memory integrated circuit (not separately shown) comprising 128K × 8 bits of storage, i.e., yielding 1,048,576 bits of non-volatile static RAM organized as 131,072 words by 8 bits. This memory integrated circuit is a dual in-line package (DIP) package configuration of generally conventional design, but the smart socket contains an internal battery supply (not separately shown) sufficient to maintain data integrity in the absence of externally applied power for a period in excess of 10 years. Dallas Semiconductor also supplies an integrated circuit non-volatile memory device that includes an integral internal battery supply, and this type of device can be used in place of the smart socket and more conventional memory device combinations. In the event a chemical solution is used to dissolve potting compound 34 in an attempt to discover the KEKs stored in RAM 142, the material comprising RAM 142 (smart socket or memory device that includes the integral internal battery supply) will also be dissolved, thereby disconnecting the internal battery supply and erasing the KEKs stored therein.

Operation of module 30 to establish and conduct secure communications is controlled by a CPU 36, which includes 32K of embedded RAM (not separately shown). In the preferred embodiment, a Dallas Semiconductor TM type DS 5000 microchip integrated circuit is used for CPU 36. The DS 5000 integrated circuit includes non-volatile embedded RAM (not separately shown) and all information and programming stored therein are preserved in the absence of an externally applied voltage for up to 10 years. In addition, the internal data registers and key configuration registers of the DS 5000 integrated circuit are non-volatile. Data stored within the embedded RAM that comprise program steps carried out by CPU 36 in establishing secure communications can be modified after encapsulation of module 30 has been accomplished with potting material 34; however, initial loading of the embedded RAM within the DS 5000 microchip comprising CPU 36 is accomplished with a conventional universal asynchronous receiver/transmitter (UART) interface (not shown) that is connected through external I/O bus 32 by lines 76. In addition, control lines 50 connect CPU 36 to external I/O bus 32 and convey write, read, interrupt, and signals for ports 0-3 (P1.0-P1.3) of the CPU.

Data lines (D0–D7) 54 interconnect CPU 36 with RAM 42 and with a buffer 46. Buffer 46 comprises an SN 74HCT245 octal bus transceiver with a three-state output that is used to block external access to internal data transfers occurring within module 30, thereby preventing an external device from accessing KEKs stored in RAM 42 and other data transferred between components of the module. Buffer 46 is enabled via control signals supplied over a line 74 by CPU 36 when it is appropriate to allow bi-directional data transfer to and from external I/O bus 32 through lines 52, and therefore to and from an external device.

To provide additional security, CPU 36 operates in an encrypted mode. The encrypted mode is deactivated prior to the initial loading of program steps and data into the embedded RAM of CPU 36. Before the initial loading of program code and data begins during manufacture of the EDU, a 40-bit encryption mode key is selected for use by CPU 36 in the encrypted mode. A data encryptor circuit and an address encryptor circuit (neither separately shown) within CPU 36 respectively control the form in which the program code is stored in the embedded RAM of the CPU and the addresses at which it is stored. As the initial loading of program steps is performed, the data encryptor circuit uses the 40-bit encryption mode key to transform or encrypt opcodes, operands, and data bytes at each memory location defined by the software. Similarly, the address encryptor circuit uses the encryption mode key in a different encryption algorithm to translate or encrypt a logical address of each data byte location into an encrypted address at which the data are actually stored. The contents of the embedded RAM are then verified, and the encrypted mode is enabled by setting a security lock bit. After the security lock bit is set to enable operation in the encrypted mode, the contents of the CPU's embedded RAM is unintelligible to an observer that might attempt to tap into its circuitry to discover the program code and other data stored therein. The address and data encryptor circuitry provides real time translation or decryption of program code and address locations to CPU 36 during subsequent operation of the EDU. Only program code and data stored in the CPU's embedded RAM that does NOT affect secure operation of the EDU can be changed after the security lock bit is set. Any attempt to externally interrogate the CPU to discover the 40-bit encryption key causes its erasure, rendering the contents of the embedded RAM useless. Even if the encrypted program code and data are thereafter read back from the embedded RAM in CPU 36, they can not be decrypted without the 40-bit encryption mode key, which is lost.

CPU 36 selects a specific storage location for a KEK within RAM 42 by setting 16 address bits. Lines 58 connect CPU 36 to a latch 44, and lines 60 connect latch 44 to RAM 42. To minimize the total number of pins required on CPU 36, the first eight address bits (A0–A7) and eight bits of data (D0–D7) use the same pins on CPU 36. These address bits and data are alternatively passed between CPU 36, latch 44, and RAM 42 over lines 58 and 60, respectively. The eight most significant bits of the address are conveyed on lines 56b directly from CPU 36 to RAM 42 and to external I/O bus 32. The least significant eight address bits (A0–A7) are carried on lines 56a. In the preferred embodiment, the 16 address bits are available on lines 56 at external I/O bus 32 to address the embedded RAM in CPU 36 when it is initially loaded or subsequently modified.

Although CPU 36 controls the operation of module 30, the actual encryption and decryption of data is implemented by a data encryption standard (DES) coprocessor 38. DES coprocessor 38 is designed to encrypt and decrypt 64-bit blocks of data using the algorithm specified in the Federal Information Processing Data Encryption Standard (No. 46). A transfer rate of 807 kilobytes per second is implemented by DES coprocessor 38 under the control of a 10 megahertz clock circuit 48, to which the DES coprocessor is connected through lines 70. Data are transferred between CPU 36 and DES coprocessor 38 over lines 72. In the preferred embodiment, a Western Digital ™ type DES WD20C03A integrated circuit is used for DES coprocessor 38, although other such devices are available from other suppliers. A decoder/multiplexer (MUX) 40 is connected through lines 68 to DES coprocessor 38 and through lines 66 to CPU 36. Decoder/MUX 40 is a three-line to eight-line circuit that decodes one of eight lines, dependent upon three binary select inputs and three enable inputs. Lines 66 carry the three binary select signals and the output signal from decoder/MUX 40 and line 68 carries selectable input 7. In addition, lines 62 carry selectable inputs 5 and 6 from RAM 42, while lines 64, which extend between decoder/MUX 40 and external I/O bus 32 convey selectable inputs 0–4.

The embedded non-volatile RAM in CPU 36 is loaded with the appropriate program steps for controlling the operation of EDU 20 at the time module 30 is manufactured. In addition, RAM 42 is loaded with a set of 65,535 public KEKs that are randomly generated from over 72 quadrillion possibilities. Each EDU that is thus produced stores the same table of 65,535 randomly generated public encryption keys. Any EDU can establish secure encrypted communications with any other EDU using the public KEKs. Also stored in RAM 42 is a user-generated table of over 65,535 randomly generated private encryption keys. These private KEKs are used for initiating secure communications with another EDU in the private network that has the same table of private KEKs stored within its RAM 42.

Figure 3:
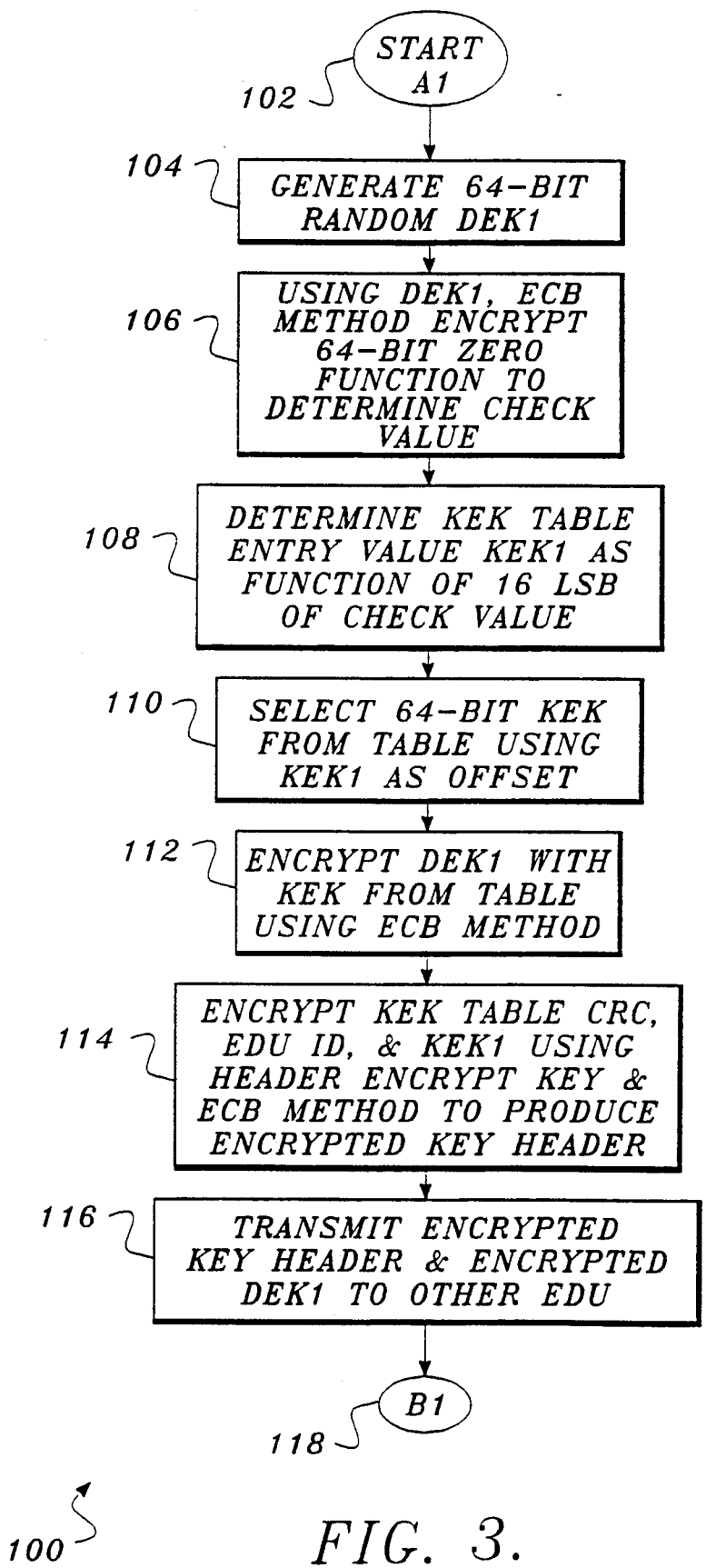
FIG. 3 is a flow chart illustrating the logical steps implemented at one station by the EDU in selecting and encrypting a first portion of a session encryption key for transmittal to another station.
Figure 4:
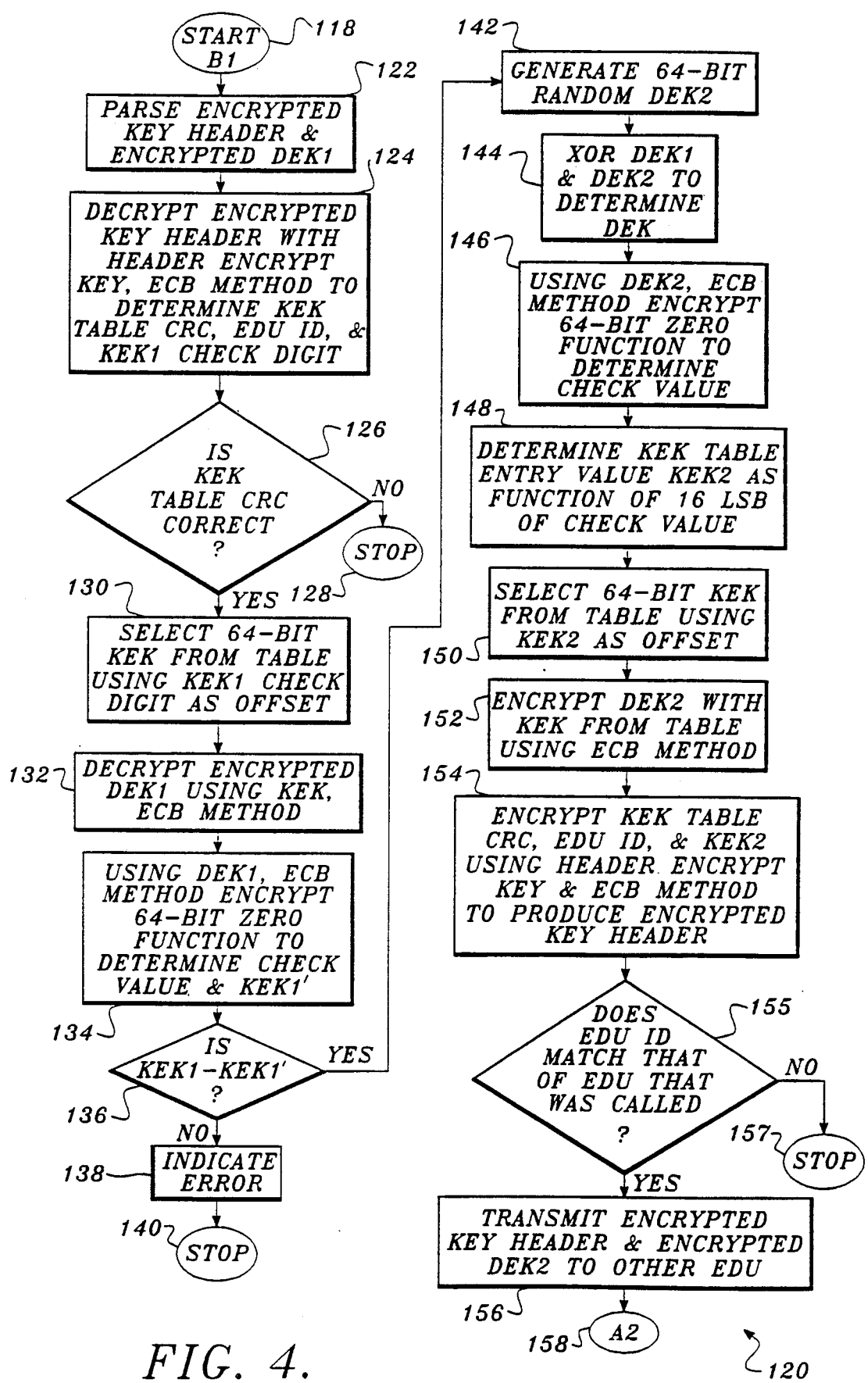
FIG. 4 is a flow chart illustrating the logical steps implemented by the EDU at the other station in decrypting the first portion of the session encryption key, and in selecting and encrypting a second portion of the session encryption key for transmittal to the one station.
Figure 5:
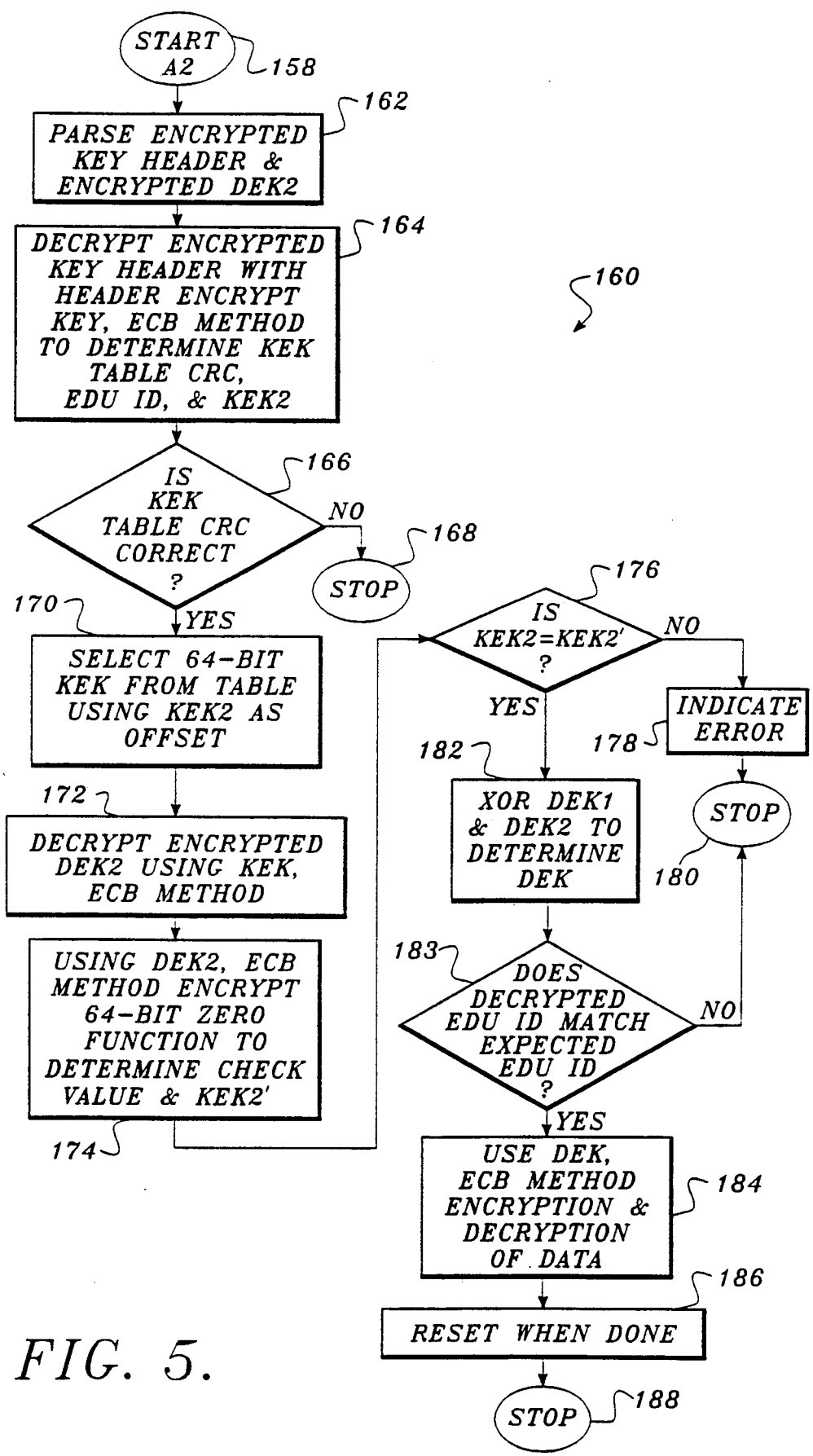
FIG. 5 is a flow chart illustrating the logical steps implemented by the EDU at the one station to decrypt the second portion of the session encryption key.

The steps involved in establishing secure communications between two EDUs are shown in FIGS. 3, 4, and 5. Not shown are any handshaking steps necessary to connect two EDUs in communication with each other so that data for a specific device can be transmitted between them. Preferably, such handshaking steps are implemented by transmitting predefined data blocks between the two devices, but do not necessarily require action by either EDU.

In FIG. 3, a flow chart 100 identifies the steps taken by EDU B 28, acting as the intended recipient, to establish secure communications. It will be apparent the steps in flow chart 100 could also be carried out by EDU A 20; however, the choice was made in the preferred embodiment to have the receiving station start the process of determining a session data encryption key, thereby avoiding the possibility that a third party posing as another station might tap into the unsecured line with an EDU to initiate the secure communications link. The method begins with a start block 102. In a block 104, EDU B 28 generates a 64-bit random data encryption key 1 (DEK1), which is one of over 72 quadrillion possible data encryption keys (i.e., all possible combinations of 56 bits).

The DEK1 is the first portion of a session data encryption key that will be subsequently used for transmitting encrypted data between the two EDUs. In a block 106, EDU B 28 then uses the DEK1 as the encryption key in implementing the DEA to encrypt one block of data. The use of the DEA to encrypt a single block of data is referred to as an electronic code book (ECB) method and is carried out by DES coprocessor 38 under the control of CPU 36. The ECB method employs the key (DEK1) to encrypt a 64-bit zero function, i.e., a function comprising 64 logical zeros, the result being used to determine a check value.

In a block 108, a KEK table entry value KEK1 comprising the 16 least significant bits (LSBs) of the 64-bit check value from block 106 is determined. The EDU uses the public or private table for KEKs, as specified by EDU A 20 during the handshaking that preceded establishing the secure communications link. The public table and private table of KEKs each represent a linear array of data, that can be taken in groups of four 16-bit words or 64-bits at a time, to define a KEK. The 16 LSBs of the check value determine the starting point or table entry value in the selected table to determine the 64 bits used as a KEK, as indicated in a block 110. Using the 64-bit KEK selected from the table as the encryption key, the EDU encrypts the value DEK1 using the ECB method in a block 112. A cyclic redundancy check (CRC) value for the KEK table that was selected is then determined in the conventional manner.

In a block 114, the EDU encrypts the KEK table CRC, its own EDU ID number (which is stored in within module 30 and is not user modifiable), and the KEK1 entry value using a predefined header encryption key and the ECB method to produce an encrypted key header. The header encryption key is stored in the embedded RAM within CPU 36 at the time that its programming is initially loaded and is the same for each EDU. In a block 116, the EDU transmits the encrypted key header and encrypted DEK1 to EDU A 20, which initiated the communication. Although both parts of this transmission are encrypted, they are encrypted at different levels of security, since the encrypted key header is always sent encrypted with the same predefined (although inaccessible) key and the encrypted DEK1 uses a different key with virtually every communication session between two EDUs. The method for establishing secure communications continues with the other EDU, at a block B1 118.

In FIG. 4, a flow chart 120 shows the steps carried out by EDU A 20 (the EDU that initiated the communication). Flow chart 120 begins at block B1 118 and proceeds to a block 122 wherein the encrypted key header and encrypted DEK1 received from EDU B 28 are parsed. In a block 124, the encrypted key header is decrypted using the predefined header encryption key with the ECB method, enabling the EDU to determine the KEK table CRC, the encoded EDU ID number of the EDU that transmitted the encrypted header, and KEK1.

A decision block 126 causes the CPU to determine if the KEK table CRC is correct, thereby ensuring that the KEK table used to encrypted the header is the same as the KEK table that will be used by EDU A 20. This step prevents two EDUs from attempting to communicate if they are using different private KEK tables or if the public table in used by one has become corrupted or is different than the normal public table of KEKs for some other reason. If the CRC value does not match the expected value, a block 128 stops communication between the EDUs. Under most circumstances, however, the KEK table CRC is correct and the logic proceeds to a block 130.

In block 130, EDU A 20 determines the 64-bit KEK that was previously selected from the public or private table by EDU B 28, using the KEK1 value that it just received as an offset to enter the table. The 64-bit KEK is then used with the ECB method to decrypt the value DEK1, as shown in a block 132.

In a block 134, a validity check is made to ensure that the decryption process was carried out correctly and that the encrypted data were not affected by noise or other problems during transmission. The validity check is carried out by using the decrypted DEK1 value and the ECB method to encrypt the 64-bit zero function. The result provides a check value, the 16 LSBs of which are a value KEK1'. The accuracy of the encryption/decryption process and transmission is confirmed in a decision block 136 if the EDU determines that KEK 1 equals KEK 1'. If not, a block 138 provides for indicating that an error has occurred in establishing secure communications, which leads to a stop block 140.

On the other hand, assuming that KEK 1 equals KEK 1', a block 142 directs the EDU to generate a 64-bit random value, DEK2, which is the second portion of the session data encryption key that will be used to encrypt data transmissions between the two EDUs. In a block 144, EDU A 20 performs a logical XOR to combine the first portion of the session key, DEK1, and the second portion, DEK2, to determine the final session data encryption key DEK.

In a block 146, DEK2 is used with the ECB method to encrypt the 64-bit zero function in order to determine a second check value. Using the 16 LSBs of the check value in a block 148, the EDU determines a table entry value KEK2. By entering the specified public or private table at the address offset determined by KEK2, four consecutive 16-bit words comprising a 64-bit KEK are determined in a block 150. The EDU uses the value of KEK from the table and the ECB method to encrypt DEK2 in a block 152.

With the predefined header encryption key, the EDU A 20 encrypts the KEK table CRC, its own EDU ID, and the table entry value KEK2, producing an encrypted key header in a block 154. The encrypted key header just produced and the encrypted DEK2 will be transmitted to EDU B 28 only if the next test is passed in a decision block 155.

Decision block 155 now determines whether the EDU ID that was decrypted from the header received from EDU B 28 in block 124 matches that of the EDU that was initially called, i.e., confirms that the intended recipient has responded. Since the encryption of the EDU ID is carried out automatically by EDU B 28, and can not be modified or affected by external signals, it is virtually impossible for a third party to use another EDU to break into a communications link and take part in establishing secure communications, since the encrypted EDU ID that is returned to the station that initiated the communication would then not match the expected EDU ID. A negative response to decision block 155 causes the process for establishing secure communications to be halted at a stop block 157. Otherwise, the process for establishing a secure communications link proceeds to a block 156. Block 156 provides for transmitting the encrypted key header and encrypted DEK2 to the other EDU, i.e., to EDU B 28, which is the intended recipient for subsequent encrypted communications. Thereafter, the logic proceeds to a block A2 158 in FIG. 5.

FIG. 5 illustrates a flow chart 160 defining the steps next implemented by EDU B 28. Following block 158, a block 162 provides for parsing the encrypted key header and encrypted DEK2. The encrypted key header is then decrypted in a block 164 using the ECB method in connection with the predefined header encryption key, enabling EDU B 28 to determine the KEK table CRC, the EDU ID of the transmitting station, and the KEK2 table entry value. In a decision block 166, EDU B 28 determines if the KEK table CRC value is correct, i.e., confirms that the public or private table of KEKs used by EDU A 20 is the same as that being used by EDU B 28. If not, the communication process is halted at a block 168. Otherwise, the process continues with a block 170.

Block 170 provides for selecting a 64-bit KEK from the designated able of KEKs using the entry value KEK2 as an offset. In a block 172, the EDU uses the selected KEK value in connection with the ECB method to decrypt the encrypted DEK2. It then performs a validity check in a block 174, by using the DEK2 value in connection with the ECB method to encrypt the 64-bit zero function, thereby determining a check value and a table entry value KEK 2' that is based upon the 16 LSBs of the check value. A decision block 176 causes CPU 36 to determine if the decrypted KEK2 equals KEK2' that was just determined in block 174. If not, a block 178 provides for indicating that an error has occurred, leading to a stop block 180.

However, assuming that the validity check has a positive response, in a block 182, the EDU logically XORs DEK1 and DEK2 to determine the value of DEK for this session. At this point, both the receiving and transmitting station EDUs have established the current session data encryption key DEK. Before the communication session can proceed, one final check is made in a decision block 183.

Decision block 183 determines if the EDU ID sent by EDU A 20 in the key header that was decrypted in block 164 by EDU B 28 matches an expected EDU ID. If not, block 180 stops the process of establishing secure communications between the two EDUs. Decision block 183 thus determines if a third EDU has been used to intercept communications between EDU A 20 and EDU B 28; if not, the communication of encrypted data proceeds at a block 184.

The session DEK is used in a block 184 by EDU A 20 to encrypt data (such as facsimile or computer data) for transmission to EDU B 28, which then decrypts it using the same DEK. When EDU B 28 determines that the last of the data to be transmitted has been received and decrypted, a block 186 provides for resetting both EDUs to await the next communication. Thereafter, a stop block 188 terminates further communication between the two stations.

During the process of establishing secure communications, neither of the EDUs linking together transmits DEK1 or DEK2 in the clear. Either the public or private table of KEKs is used for encrypting the first and second portions of the current session DEK. Consequently, only another EDU provided with the same control program and the same table of KEKs (producing the same CRC value) would be able to decrypt either the encrypted first or second portions of the DEK. Since the software program controlling the operation of the EDUs requires that the EDU ID number of the stations be encrypted as part of the key header information that is exchanged, a third EDU cannot be used to surreptitiously substitute for the intended receiving station or transmitting station during the establishment of the secure communication link. Consequently, only the two EDUs at the receiving and transmitting stations comprising a link are able to communicate to establish a session DEK and thereafter carry on secure communications.

Only an EDU having the same session DEK used to encrypt data can decrypt the data. Furthermore, although any EDU can establish secure communications with any other EDU using the public table of KEKs, only EDUs having the same private table of KEKs (determined from the KEK table CRC value) can establish a session DEK to communicate with each other. As a result, a corporation that generates its own table of private KEKs can ensure that secure communications are initiated only with other stations comprising its private network that include the same table of private KEKs.

While the DES algorithm is used in the preferred form of the present invention, it will be appreciated that other encryption algorithms that use an encryption key can also be employed. Further, when determining a check value, a predefined function other than the zero function can be used. It should also be apparent that the encrypted key header need not include the EDU ID, if a lower level of security is acceptable, for example, in a local network of EDUs exclusively using private KEKs. These and other modifications to the present invention will be apparent to those of ordinary skill in the art. Accordingly, it is not intended that the invention be in any way limited by the description of the preferred embodiment and modifications thereto, but instead that the scope of the invention be determined entirely by reference to the claims that follow.

The embodiments of the invention in which an exclusive property or privilege is claimed are defined as follows:

1. Encryption/decryption apparatus for ensuring secure communications between two stations, said encryption/decryption apparatus disposed at each station comprising:
   (a) encryption processor means for encrypting and decrypting data using an encryption key that is input thereto;
   (b) control means, coupled to the encryption processor means, for controlling the operation of the encryption processor means, said control means supplying the encryption processor means with data for encryption and decryption and with the encryption key for use in encrypting and decrypting the data to produce an output signal in response to programmed instructions that cause it to automatically randomly select a part of a session data encryption key for use by the encryption processor means to encrypt data when combined with another part of the session data encryption key received from the other station; and
   (c) non-volatile memory means, coupled to the control means, for storing a plurality of key encryption keys used by the encryption processor means in encrypting the part of the session data encryption key for transmission to the other station, said control means selecting the key encryption key from said plurality of key encryption keys as a function of a check value determined by the control means with the part of the session key.

2. The encryption/decryption apparatus of claim 1, wherein said non-volatile memory means include an internal power source that supplies electrical power to maintain storage of the plurality of key encryption keys.

3. The encryption/decryption apparatus of claim 1, further comprising potting means for encapsulating the encryption processor means, the control means, and the non-volatile memory means in a radio and light wave opaque material, said potting means being sufficiently hard and resistant to dissolution by solvents to prevent its removal without causing damage to interconnections coupling the non-volatile memory means to the control means and damage to interconnections supplying electrical power to the non-volatile memory means from the internal power source, such damage causing erasure of the plurality of key encryption keys stored in the non-volatile memory means, said control means also responding to any attempt to externally interrogate the non-volatile memory means by causing erasure of the key encryption keys stored therein.

4. The encryption/decryption apparatus of claim 1, further comprising multiplexer means, coupled to the control means to receive a select signal therefrom, and coupled to the encryption processor means, an output port, and the memory means, for selectively conveying a data signal thereto in response to the select signal.

5. The encryption/decryption apparatus of claim 1, wherein the control means include a non-volatile memory for storing the programmed instructions and for storing a unique indentification code that identifies a specific encryption/decryption apparatus.

6. The encryption/decryption apparatus of claim 5, wherein the control means include means for locking the control means and its non-volatile memory to prevent data and program steps from being read externally or changed after storage of the programmed instructions in said non-volatile memory is complete.

7. The encryption/decryption apparatus of claim 6, wherein the means for locking include means for encrypting data and memory addresses defining memory storage locations within the non-volatile memory of the control means and within the non-volatile memory means.

8. Encryption/decryption apparatus for ensuring secure communications, comprising:
   (a) processor means for randomly selecting a partial session data encryption key;
   (b) encryption means for encrypting the partial session data encryption key, producing an encrypted part key and decrypting another partial session data encryption key selected at another location; and (c) means for conveying the encrypted part key to an output port so that it can be transmitted to the other location and for conveying an encrypted signal from an input port, said encryption means decrypting the other partial session data encryption key received from the other location as the encrypted signal, said processor means combining the partial session data encryption key to determine the current session data encryption key that is subsequently used by it to encrypt data transmitted to the other location and the decrypt encrypted signals received from the other location.

9. The encryption/decryption apparatus of claim 8, further comprising memory means for storing a plurality of key encryption keys, wherein the encryption means select a specific key encryption key from the plurality of key encryption keys as a function of a check value, said encryption means encrypting a predefined set of characters with said part of the encryption key to determine the check value.

10. The encryption/decryption apparatus of claim 9, wherein the means for transmitting also transmit the check value determined by the encryption means.

11. The encryption/decryption apparatus of claim 10, wherein the decryption means use a check value received from said other location to determine a specific key encryption key that was used to encrypt the other partial session data encryption key.

12. The encryption/decryption apparatus of claim 11, wherein:
(a) the encryption means use the other partial session data encryption key decrypted by the decryption means to encrypt the predefined set of characters, producing a test value;
(b) said processor means compare the test value with a check value received from the other location and detect an error if the test value differs from said check value received from the other location; and
(c) if an error is detected in (b), said processor means halt communications with said other location.

13. The encryption/decryption apparatus of claim 9, wherein said memory means store a unique identification code for that apparatus.

14. The encryption/decryption apparatus of claim 9, wherein the memory means comprise a non-volatile memory circuit including an internal power source, said internal power source supplying electrical current to the non-volatile memory circuit to retain data stored therein, said memory means being encapsulated in a material that precludes physical inspection of the memory circuit, preventing discovery of the data stored therein, further comprising means for interrupting electrical current supplied from the internal power source to the memory circuit so that the data stored therein are erased if the material encapsulating the memory means is removed therefrom.

15. The encryption/decryption apparatus of claim 8, wherein the processor means comprise a central processing unit that is programmed to control the encryption means and the decryption means according to a predefined set of instructions.

16. The encryption/decryption apparatus of claim 8, wherein the encryption means comprise an integrated circuit that implements encryption and decryption of data from a plurality of sources in response to signals from the processor means, using the current session data encryption key, in accordance with a predefined encryption algorithm and a corresponding predefined decryption algorithm.

17. The encryption/decryption apparatus of claim 9, wherein the memory means store a plurality of sets of key exchange keys, further comprising means for selecting one of the sets of key exchange keys from which the specific key exchange key is determined.

18. Encryption/decryption apparatus for ensuring secure communications, comprising:
(a) a sealed circuit encapsulated in a material opaque to radio and light waves, said sealed circuit comprising:
(i) a central processing unit that receives and transmits data in both an encrypted and decrypted form;
(ii) a memory circuit coupled to the central processing unit, at least one predefined set of key exchange keys being stored in the memory circuit, said key exchange keys stored in the memory circuit being externally inaccessible, both physically by inspection and by downloading through the central processing unit;
(iii) an encryption/decryption coprocessor coupled to the central processing unit to receive data therefrom, said encryption/decryption coprocessor encrypting and decrypting the data under control of the central processing unit based upon a specified encryption key, the encryption/decryption coprocessor selectively generating a second set of key exchange keys that are also stored in the memory circuit;
(b) connector means for interconnecting the sealed circuit with external data input and output lines, the encryption/decryption coprocessor selectively encrypting the second set of key exchange keys and the connector means conveying the second set of key exchange keys in an encrypted form to an external device for distribution to other encryption/decryption apparatus comprising a limited network, whereby only encryption/decryption apparatus comprising the limited network can securely communicate with each other using the second set of key exchange keys, but can securely communicate with other like encryption/decryption apparatus that do not comprise the limited network using the predefined set of key exchange keys.

19. The encryption/decryption apparatus of claim 18, further comprising memory means coupled to the central processing unit, for storing program steps controlling automatic determination of a session data encryption key for use in encrypting and decrypting data, said session data encryption key being determined in part by the central processing unit logically combining a first randomly selected portion of the session data encryption key that is received in an encrypted form from another location with a second randomly selected portion of the session data encryption key that the central processing unit transmits to the other location in an encrypted form.

20. The encryption/decryption apparatus of claim 19, wherein one of the predefined set and the second set of key exchange keys is selectively used for encrypting said other portion of the session data encryption key.

21. The encryption/decryption apparatus of claim 18, wherein the memory circuit stores a unique identification code for the sealed circuit that can not be changed, said central processing unit halting operation of the sealed circuit if data are received from the other location that specify a different identification code, thereby preventing secure communications with an unintended encryption/decryption apparatus.

22. Encryption/decryption apparatus for ensuring secure communications between two stations, comprising:
   (a) first processor means at one of the stations for randomly selecting a first part encryption key and second processor means at the other of the two stations for randomly selecting a second part encryption key;
   (b) encryption means at said one station for encrypting the first part encryption key, producing an encrypted first part key;
   (c) means for transmitting the encrypted first part key to said other station;
   (d) decryption means at said other station for decrypting the encrypted first part key to determine the first part encryption key;
   (e) encryption means at said other station for encrypting the second part encryption key, producing an encrypted second part key;
   (f) means for transmitting the encrypted second part key to said one station; and
   (g) decryption means at said one station for decrypting the encrypted second part key to determine the second part encryption key, said first processor means at said one station and said second processor means at said other station then combining the first part encryption key and the second part encryption key to determine an encryption key that is used to encrypt and decrypt subsequent communications between the two stations.

23. The encryption/decryption apparatus of claim 21, further comprising memory means for storing a plurality of key encryption keys at each of the two stations, wherein the encryption means at each station select a specific key encryption key from the plurality of key encryption keys as a function of a first check value and a second check value, respectively, said encryption means at said one station encrypting a predefined set of characters with said first part encryption key to determine the first check value, and said encryption means at said other station encrypting the predefined set of characters with said second part encryption key to determine said second check value.

24. The encryption/decryption apparatus of claim 22, wherein the means for transmitting from each station also transmit the respective first or second check value determined by the encryption means at each station.

25. The encryption/decryption apparatus of claim 23, wherein the decryption means at said other station use the first check value received from said one station to determine the specific key encryption key that was used by the encryption means at said one station to encrypt the first part encryption key, and wherein the decryption means at said one station use the second check value received from said other station to determine the specific key encryption key that was used by the encryption means at said other station to encrypt the second part encryption key.

26. The encryption/decryption apparatus of claim 24, wherein:
   (a) the encryption means at said other station uses the first encryption key decrypted by the decryption means to encrypt the predefined set of characters, producing a test check value;
   (b) said second processor means compares the test check value with the first check value and detects an error if the test check value differs from the first check value;
   (c) the encryption means at said one station uses the second encryption key decrypted by the decryption means to encrypt the predefined set of characters, producing a test check value;
   (d) said first processor means at said one station compares the test check value with the second check value and detects an error if the test check value differs from the second check value; and
   (e) if an error is detected in (b), said second processor means halt communications with said one station, and if an error is detected in (d), said first processor means halt communications with said other station.

27. The encryption/decryption apparatus of claim 22, wherein said memory means at each station store a unique identification code for that station.

28. The encryption/decryption apparatus of claim 26, wherein the encryption means at said one station encrypt the unique identification code of said other station, the means for transmitting then transmitting an encrypted identification code to said other station, said decryption means at said other station decrypting the unique identification code.

29. The encryption/decryption apparatus of claim 27, wherein said second processor means compare the decrypted unique identification code with the unique identification code stored in the memory means and if not identical, halt communications with said one station.

* * * * *